(12) United States Patent
Nakagawa et al.

(10) Patent No.: US 6,669,288 B2
(45) Date of Patent: Dec. 30, 2003

(54) CHILD SEAT DEVICE

(75) Inventors: Osamu Nakagawa, Hikone (JP); Junichi Yoshida, Hikone (JP)

(73) Assignee: Takata Corporation, Tokyo (JP)

(*) Notice: Subject to any disclaimer, the term of this patent is extended or adjusted under 35 U.S.C. 154(b) by 82 days.

(21) Appl. No.: 10/000,095

(22) Filed: Dec. 4, 2001

(65) Prior Publication Data
US 2002/0074840 A1 Jun. 20, 2002

(30) Foreign Application Priority Data
Dec. 14, 2000 (JP) .................................. 2000-380580

(51) Int. Cl.$^7$ ................................................ A47D 1/10
(52) U.S. Cl. ......................... 297/256.16; 297/216.11; 297/472
(58) Field of Search ................... 297/256.16, 253, 297/130, 250.1, 216.11, 216.16, 216.19, 472

(56) References Cited

U.S. PATENT DOCUMENTS

| | | | |
|---|---|---|---|
| 4,215,900 A | * | 8/1980 | Coult |
| 5,286,085 A | * | 2/1994 | Minami |
| 5,630,645 A | | 5/1997 | Lumley et al. |
| 5,664,830 A | | 9/1997 | Garcia et al. |
| 5,685,603 A | | 11/1997 | Lane, Jr. |
| 6,183,044 B1 | | 2/2001 | Koyanagi et al. |
| 6,375,260 B1 | * | 4/2002 | Hiramatsu et al. |
| 6,454,350 B1 | * | 9/2002 | Celestina-Krevh et al. |

FOREIGN PATENT DOCUMENTS

| | | |
|---|---|---|
| EP | 0 927 659 | 7/1999 |
| FR | 2 302 209 | 9/1976 |
| JP | 8-85418 | 4/1996 |
| JP | 9-254687 | 9/1997 |
| JP | 2000-280800 | 10/2000 |
| JP | 2000-296732 | 10/2000 |

* cited by examiner

Primary Examiner—Laurie K. Cranmer
(74) Attorney, Agent, or Firm—Kanesaka & Takeuchi

(57) ABSTRACT

In a child seat device, a child seat body is connected to a base while a bar disposed at the front bottom thereof is engaged with a guide member disposed at the front of the base, and the child seat body is pivotally supported on the arms standing at the rear of the base via shafts on the right and left rear sides thereof. The guide member extends forward and upward from the front of the base. The bar is movable along the guide member. In the case of a head-on collision of the car, the child seat body pivots on the shafts, so that the bar swings along the guide member to reduce the load to be applied to a passenger.

5 Claims, 8 Drawing Sheets

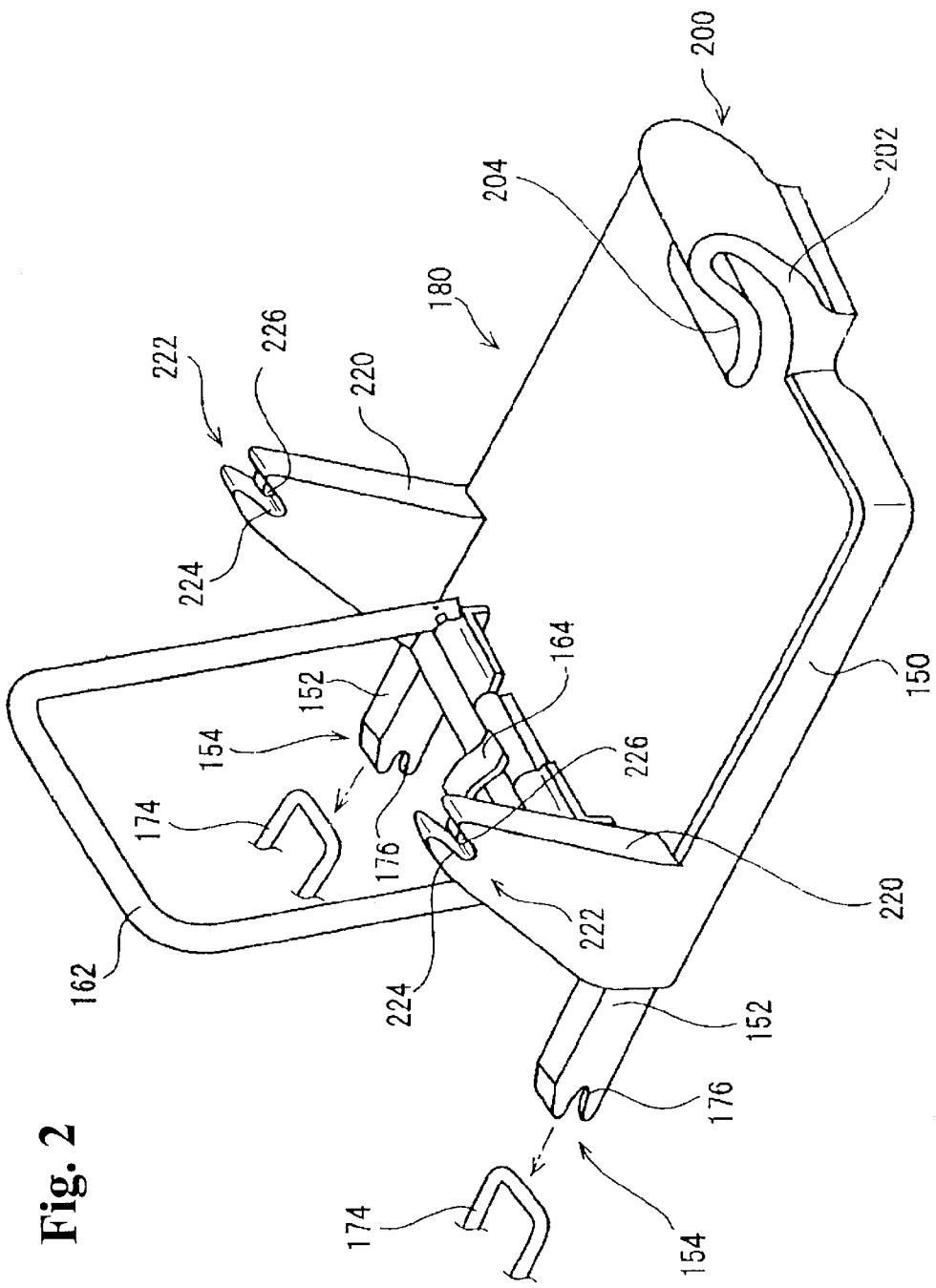

CHILD SEAT DEVICE

BACKGROUND OF THE INVENTION AND RELATED ART STATEMENT

The present invention relates a child seat device to be installed on a seat of a car, and more preferably, to a child seat device including a base fixed to a car-side member and a child seat body mounted on the base.

While conventional child seats are held so as to be fastened on a seat cushion of a car by a webbing of an adult seat belt device, they are inconvenient such that, for example, it is difficult to know how to pass the webbing.

Accordingly, Japanese Patent Publication (KOKAI) No. 2000-280800 proposes a child seat device in which car-side members only for fixing the child seat device are placed on right and left rear sides of a seat, a base is connected to the car-side members, and a child seat body is mounted on the base.

FIG. 9 is a perspective view showing a configuration of the child seat device.

The child seat device comprises a child seat body 12 including a seat portion 30, a back portion 32 and arm portions 34, and a base 18 to which the child seat body 12 is fixed detachably. A connecting bottom plate 14 is combined with the child seat body 12. The base 18 is fixedly placed on a seat cushion of a seat of a car.

The bottom plate 14 comprises a rectangular main plate portion 40, a flange 42 extending from a rear side of the main plate portion 40, an opening 44 formed at the front of the main plate portion 40, and a bar 46 extending parallel to a front side of the main plate portion 40 so as to cross the opening 44.

The base 18 comprises a base body 50 shaped like a rectangular plate, a pair of arms 52 extending rearwardly from right and left rear ends of the base body 50, grip portions 54 formed at leading ends of the arms 52, a hook 56 formed at the front of the base body 50, a bar-engaging member 58, an operating piece 60 for disengaging the hook 56, a swing stopper 62 formed on an upper rear surface of the base body 50 and serving as a swing-preventing member, a lever 64 for releasing the swing stopper 62, a flange-pressing member 66 to be engaged with the flange 42, an operating piece 68 for unclamping the grip portions 54, windows 70 for indicating the gripping condition by the grip portions 54, and the like.

The arm 52 has, at the rear end, the grip portion 54 for gripping one of clamp bars 74 formed on the right and left rear sides of the car seat. The clamp bar 74 extends in the widthwise direction of the car. Each grip portion 54 receives the clamp bar 74 in a recess 76 formed at the rear end of the arm 52, and latches the clamp bar 74 by a hook (not shown) formed inside the recess 76, thereby gripping the clamp bar 74.

In order to unlatch the bar 74 from the hook, the operating piece 68 and the hook are connected via sliding plates 92 and hook-operating rods 94.

The operating piece 68 is movable to the front and rear sides of the base 18 inside an opening 96 formed on the upper surface of the base 18. The sliding plate 92 formed integrally with the operating piece 68 extends rightward and leftward, and is connected to front ends of the hook-operating rods 94. Rear ends of the hook-operating rods 94 are drivingly connected to ends of the hooks. When the rods 94 are moved to the right in FIG. 9, the hooks and the clamp bars 74 are disengaged from each other.

When the right and left arms 52 are connected to the corresponding clamp bars 74, the base 18 can not move to the front, rear, right, and left sides of the car, but the leading end thereof can swing up and down. In order to prevent the leading end of the base 18 from swinging, the swing stopper 62 is provided as a swing-preventing member.

The swing stopper 62 is formed of an inverse-U-shaped pipe. Bottom ends of the swing stopper 62 are connected to and combined with a shaft 100 by pins (not shown). The shaft 100 extends in the right and left directions of the base 18, and is rotatably supported on right and left wall portions 102 of the flange-pressing member 66.

In a normal state, the swing stopper 62 is prevented by a lock mechanism (not shown) from pivoting forward, and is allowed to pivot only rearward. By pushing the lever 64 down, the lock mechanism is released, and the swing stopper 62 is allowed to pivot forward. Therefore, by pressing the swing stopper 62 rearwardly against a seat back of the car seat after the base 18 is placed on the seat and the arms 52 of the base 18 are connected to the clamp bars 74, the base 18 is fixed so that it can not move forward, rearward, rightward, leftward, upward, and downward. The base 18 can be detached from the seat by pivoting the swing stopper 62 forward while pressing the lever 64, and pulling the operating piece 68 forward to release the clamp bars 74 from the grip portions 54.

In order to mount the child seat body 12 on the base 18 fixed on the seat of the car, the flange 42 of the connecting bottom plate 14 is inserted beneath the flange-pressing member 66, the front side of the child seat body 12 is pushed down, and the bar 46 is pushed into the bar-engaging member 58 and is retained by the hook 56, whereby the child seat body 12 is connected to the base 18.

When the bar 46 of the connecting bottom plate 14 is pressed against the hook 56 from above, the hook 56 retracts, and the bar 46 enters a groove of the bar-engaging member 58. When the bar 46 has been completely placed in the groove, the hook 56 advances and covers the bar 46, so that the connecting bottom plate 14 and the child seat body 12 combined therewith are fixed onto the base 18.

In order to release the fixing condition, the hook 56 is retracted by pressing the operating piece 60, and the child seat body 12 can be pulled up.

In this way, the child seat body 12 and the base 18 are separated in the child seat device, and therefore, they can be separately carried into the car and can be separately installed. When fixing the base 18, since the child seat body 12 is separated therefrom, the grip portions 54 of the arms 52 and the clamp bars 74 can be connected easily.

In order to fix the base 18, it is only necessary to engage the arms 52 and the clamp bars 74 and then to tilt the swing stopper 62 rearwardly. This is quite easy, and the fixing strength of the base 18 is remarkably high. In order to fix the child seat body 12 to the base 18, it is also only necessary to insert the flange 42 beneath the flange-pressing member 66 and to then push the front side of the child seat body 12 downwardly. This is quite easy. Moreover, the child seat body 12 and the base 18 are connected quite firmly.

When the car is involved in a head-on collision (including offset collision, this is also applied to the following) during driving, and an impact large enough to stop the car is applied thereto, a quite large forward force acts on the child seat device installed on the seat cushion of the car.

In this case, when the rear bottom of the child seat device is connected to the car-side member and the child seat device is restrained from moving forward, a pivoting force on the car-side member on the rear side is formed in the base. When the pivoting force is quite large, the base pivots on the car-side member, and the front of the base sinks into the seat cushion. With this, a force is applied to the child seat body fixed on the base so that the front thereof sinks.

An object of the present invention is to provide a child seat device which reduces such downward movement of the front of a child seat body caused in the case of a head-on collision of the car.

SUMMARY OF THE INVENTION

A first aspect of the invention provides a child seat device having a base placed on a seat cushion and connected at the rear thereof to a car-side member, and a child seat body placed on the base. The child seat device includes a guide member extending forward and upward from the front of the base, and an engaging member which engages with and moves along the guide member.

In such a child seat device according to the first aspect of the invention, the front of the child seat body is connected to the base, which is placed on the seat cushion of the car seat and is connected to the car-side member at the rear thereof, via the engaging member and the guide member engaging the engaging member. In this case, since the engaging member is movable along the guide member, the front of the child seat body can move relative to the base in the forward and upward directions which correspond to the extending direction of the guide member.

Accordingly, even when the base of the child seat device pivots, and the front thereof sinks into the seat cushion in the case of a head-on collision during driving, the front of the child seat body is separated from the base and swings forward and upward along the guide member. Therefore, the child seat body will not incline forward while following the pivotal movement of the base, and a heavy load will not be imposed on the passenger sitting in the child seat body.

According to a second aspect of the invention, in the child seat device, preferably, the engaging member disposed at the front bottom of the child seat body is a bar extending in the widthwise direction of the child seat body, and the guide member includes a first guide portion rising forward and upward from the base, and a second guide portion extending nearly parallel to the first guide portion along the rear side of the first guide portion. The top of the second guide portion is connected to the first guide portion, and the bottom of the second guide portion is spaced from the base. Thus, a space is formed between the bottom of the second guide portion and the base so as to allow the bar to move therein.

This structure makes it easy to connect the child seat body and the base and to detach the child seat body from the base.

Namely, in order to connect the child seat body to the base, it is only necessary to pass the bar formed at the front bottom of the child seat body between the first guide portion and the second guide portion from below the second guide portion which is spaced from the base. In order to detach the child seat body from the base, it is only necessary to draw the bar from between the first guide portion and the second guide portion through the space formed beneath the second guide portion which is spaced from the base. In a state in which the child seat body and the base are connected, that is, in a state in which the bar serving as the engaging member is engaged with the guide member, of course, since the bar extending in the widthwise direction of the child seat body is movable between the first guide portion and the second guide portion, the front of the child seat body can move in the forward and upward direction corresponding to the extending direction of the guide member.

In the child seat device according to the second aspect of the invention, an energy-absorbing member may be formed between the first guide portion and the second guide portion so as to deform and absorb the kinetic energy of the child seat body when the bar moves between the first guide portion and the second guide portion (third aspect of the invention).

In such a structure, when the child seat body moves forward along the guide member in the case of a collision of the car, as described above, the kinetic energy thereof is absorbed by the energy-absorbing member via the bar. This substantially reduces the load to be applied to the passenger sitting in the child seat body.

Instead of forming the energy-absorbing member in the guide member, the top of the first guide portion and the top of the second guide portion may be elastically connected, and at least one of the opposing faces of the first guide portion and the second guide portion may be provided with a projection which is pressed by the bar so as to move the second guide portion closer to and away from the first guide portion when the bar moves therebetween (fourth aspect of the invention).

In such a structure, since the kinetic energy of the child seat body is absorbed because the bar elastically moves relative to the second guide portion closer to and away from the first guide portion when the bar moves between the first guide portion and the second guide portion, the load to be applied to the passenger sitting in the child seat body in the case of a head-on collision of the car can be substantially reduced, in a manner similar to that of the above-described energy-absorbing member.

A fifth aspect of the invention provides a child seat device having a base fixed on a seat cushion, a child seat body placed on the base, and a connecting member for connecting the rear bottom of the child seat body and the car-side member or the rear of the base, wherein the connecting member increases the length thereof while absorbing the kinetic energy of the child seat body when a tension higher than a predetermined value is applied thereto from the child seat body.

In such a child seat device according to the fifth aspect of the invention, the child seat body is bound on the seat while the connecting member disposed at the rear bottom thereof is connected to the car-side member or the rear of the base. When the car collides at the head, the connecting member increases its length while absorbing the kinetic energy of the child seat body. This substantially reduces the load to be applied to the passenger sitting in the child seat body.

BRIEF DESCRIPTION OF THE DRAWINGS

FIG. 2 is a perspective view of a base of the child seat device shown in FIG. 1;

DETAILED DESCRIPTION OF PREFERRED EMBODIMENTS

Figure 1:
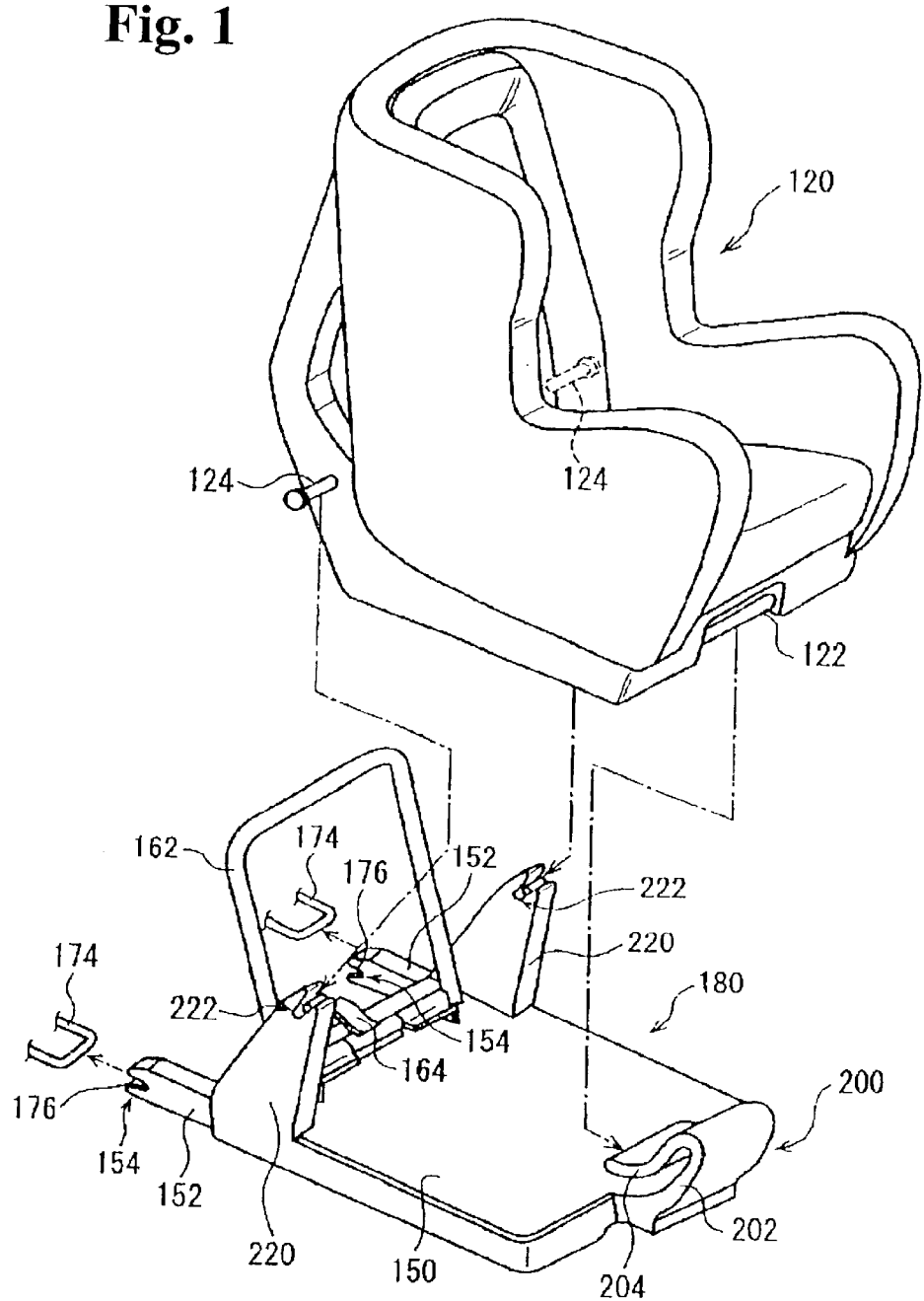
FIG. 1 is an exploded perspective view of a child seat device according to an embodiment of the present invention.

Embodiments of the present invention will be described below with reference to the drawings. FIG. 1 is an exploded perspective view of a child seat device according to an embodiment of the present invention, and FIG. 2 is a perspective view of a base of the child seat device.

The child seat device comprises a child seat body 120, and a base 180 to which the child seat body 120 is connected detachably.

The base 180 comprises a base body 150 shaped like a rectangular plate, a pair of arms 152 extending rearward from right and left rear ends of the base body 150, grip portions 154 formed at leading ends of the arms 152, a guide member 200 extending forward and upward from the front of the base body 150, a pair of child-seat-body supporting arms 220 standing on the right and left rear sides of the upper surface of the base body 150, a swing stopper 162 formed on the upper rear surface of the base body 150 so as to serve as a swing-preventing member, a lever 164 for releasing the swing stopper 162, and the like.

The arms 152 grip clamp bars 174 formed on right and left rear sides of a car seat in the grip portions 154 at the leading ends thereof. The clamp bars 174 extend in the widthwise direction of the car. Each of the grip portions 154 receives the clamp bar 174 in a recess 176 formed at the leading end of the arm 152, and latches the clamp bar 174 by a hook (not shown) formed in the recess 176, thereby gripping the clamp bar 174. The clamp bar 174 can be arbitrarily unlatched from the hook by operating an operating piece or the like (not shown), as in the prior art.

When the right and left arms 152 are connected to the clamp bars 174, the base 180 can not move in the forward, rearward, rightward, and leftward directions of the car, but the front side thereof can swing up and down. In order to prevent the front side of the base 180 from swinging up and down, the swing stopper 162 is provided so as to function as the swing-preventing member.

The swing stopper 162 is formed of an inverse-U-shaped pipe. The bottom ends of the swing stopper 162 are mounted on the base 180 via a shaft (not shown), which extends to the right and left sides of the base 180, or the like so that it can pivot forward and rearward.

Usually, the swing stopper 162 is prevented from pivoting forward by a lock mechanism (not shown) and is allowed to pivot only rearward, as in the prior art. When a lever 164 is pushed down, the lock mechanism is released, and the swing stopper 162 is allowed to pivot forward. Therefore, by placing the base 180 on the car seat, connecting the arms 152 on the rear side of the base 180 to the clamp bars 174, and pressing the swing stopper 162 rearward against a seat back of the seat, the base 180 is bound on the seat, so that it can not move forward, rearward, rightward, leftward, and upward. The base 180 can be detached from the seat by pivoting the swing stopper 162 while pressing the lever 164, and by releasing the gripping of the clamp bars 174 by the grip portion 154.

The child seat body includes a bar 122 extending from the front bottom thereof in the widthwise direction, and a pair of shafts 124 extending from the right and left side faces at the rear bottoms in the widthwise direction. The child seat body 120 is connected to the base 180 by engaging the bar 122 at the front bottom with the front guide member 200 of the base 180, and rotatably supporting the right and left shafts 124 at the rear bottoms on the right and left arms 220 on the rear side of the base 180, respectively.

The guide member 200 is composed of a first guide portion 202 which rises forward and upward from the front end of the upper surface of the base 180, and a second guide portion 204 extending nearly parallel to the first guide portion 202 along the rear side (nearly left side in FIGS. 1 and 2) of the first guide portion 202.

The first guide portion 202 and the second guide portion 204 are arranged to have a space therebetween such that the bar 122 can move parallel to and along the first guide portion 202 (or the second guide portion 204) while extending parallel to the widthwise direction of the base 180, and they are connected and combined at the tops thereof. The bottom of the second guide portion 204 is spaced from the upper surface of the base 180, and the space is formed between the bottom of the second guide portion 204 and the upper surface of the base 180 such as to allow the bar 122 extending parallel to the widthwise direction of the base 180 to move therein.

The bar 122 formed at the front bottom of the child seat body 120 enters between the first guide portion 202 and the second guide portion 204 from the rear side of the guide member 200 through the space between the bottom of the second guide portion 204 and the upper surface of the base 180 while extending parallel to the widthwise direction of the base 180, and the bar 122 engages the guide member 200. When engaged with the guide member 200, the bar 122 can move forward and upward in parallel relative to the base 180 along the first guide portion 202 (or the second guide portion 204) between the first guide portion 202 and the second guide portion 204. Since the top of the first guide portion 202 and the top of the second guide portion 204 are integrally connected, the bar 122 will not fall off through the top of the guide member 200.

The bar 122 and the guide member 200 can be easily disengaged by moving the bar 122 to the bottom of the guide member 200 along the first guide portion 202 (or the second guide portion 204) and drawing the bar 122 to the outside through the space between the second guide portion 204 and the upper surface of the base 180.

At the top end of each of the arms 220 for pivotally supporting the child seat body, a grip portion 222 is formed so as to rotatably grip the above-described shaft 124. The grip portion 222 receives the shaft 124 in a recess 224 which is formed at the top end of the arm 220, latches the shaft 124 by a hook 226 formed in the recess 224, and thereby grips the shaft 124 in the recess 224.

The hook 226 is adapted to prevent the shaft 124 inserted in the recess 224 from falling off the recess 224, and to allow the shaft 124 to rotate about its axis inside the recess 224. For this reason, when the shafts 124 are gripped in the grip portions 222, the child seat body 120 is supported on the arms 220 so that it can pivot on the shafts 124.

The shaft 124 can be arbitrarily unlatched from the hook 226 by operating an operating piece (not shown).

In order to mount the child seat body 120 on the base 180, first, the child seat body 120 is placed on the base 180 while the front thereof is inclined downward, and the bar 122 at the front bottom is placed beneath the rear of the guide member 200. In this case, the extending direction of the bar 122 is set parallel to the widthwise direction of the base 180.

Subsequently, the child seat body 120 is slid forward so that the bar 122 enters between the first guide portion 202 and the second guide portion 204 from below the second guide portion 204, and the bar 122 and the guide member 200 are engaged with each other. After that, the rear side of the child seat body 120 is lowered onto the base 180 so that the shafts 124 enter the recesses 224 of the grip portions 222 from the top sides of the arms 220. Then, the shafts 124 are placed in the recesses 224 and latched by the hooks 226 to be firmly held inside the recesses 224. After it is confirmed that the child seat body 120 is pivotally supported by the arms 220, the connection of the child seat body 120 and the base 180 is completed.

In order to detach the child seat body 120 from the base 180, firstly, the shafts 124 are unlatched from the hooks 226 by operating the operating piece (not shown), and the child seat body 120 and the base 180 are then disconnected while tracing back the above-described procedure for mounting the child seat body 120 on the base 180.

The guide member 200 is curved so that its upper surface is concaved, and the first guide portion 202 and the second guide portion 204 have curvatures to have a center coaxially on the shafts 124 rotatably supported at the tops of the arms 220. For this reason, the child seat body 120 can pivot around the shafts 124 while being connected to the base 180, as described above. By the pivotal movement on the shafts 124, the front of the child seat body 120 can move forward and upward relative to the base 180 along the guide member 200.

Figure 3A:
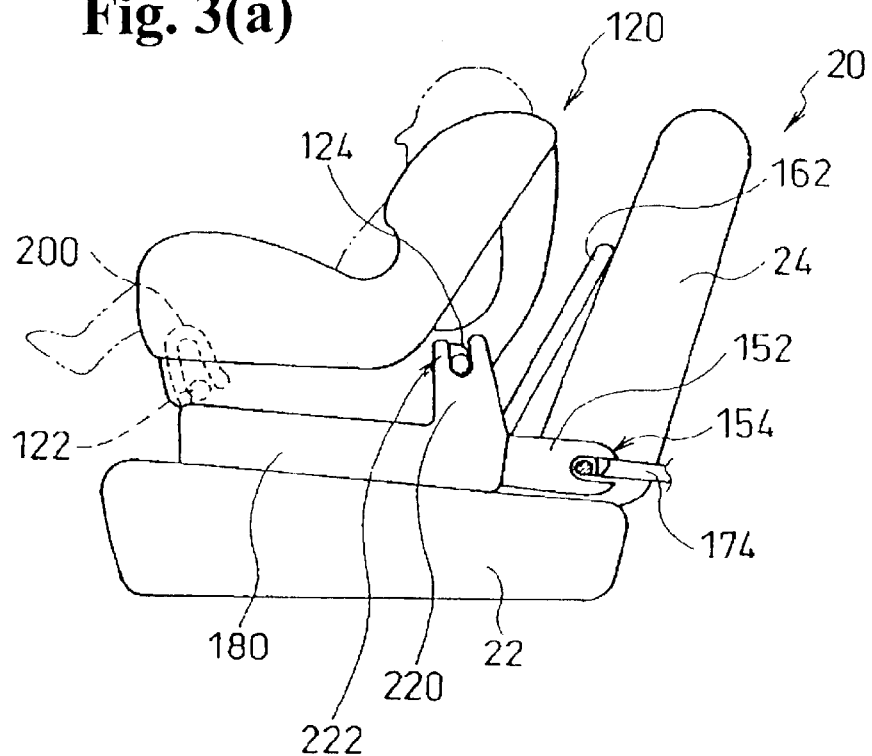
FIGS. 3(a) and 3(b) are explanatory views showing operation manners of the child seat device shown in FIG. 1.
Figure 3B:
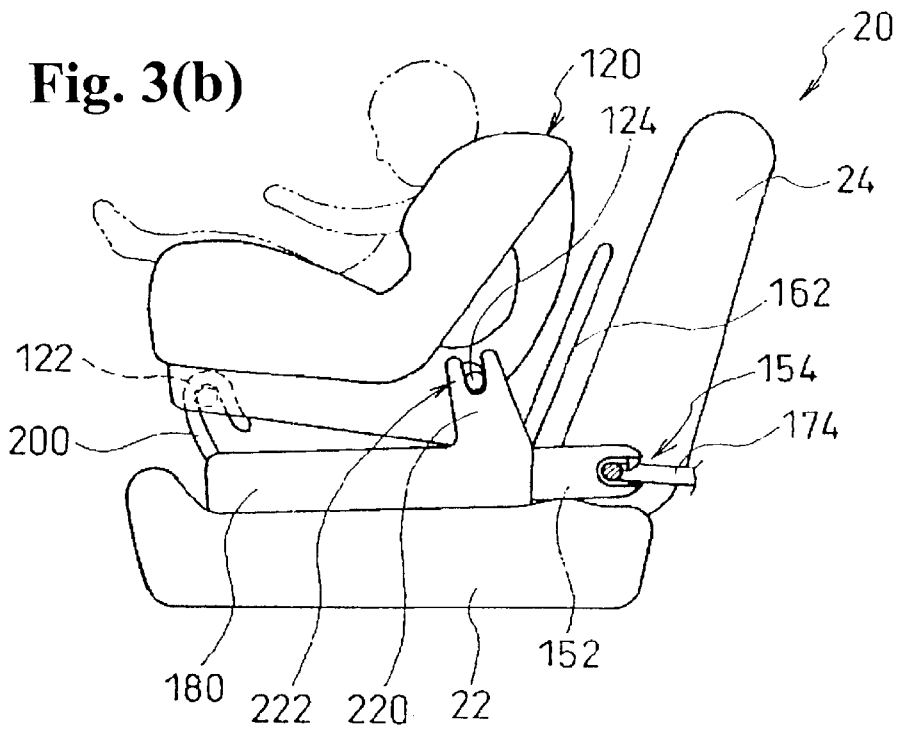

The operation manner of the child seat device with such a configuration will be described below with reference to FIGS. 3(a) and 3(b). FIG. 3(a) is a side view showing a normal operating state of the child seat device, and FIG. 3(b) is a side view showing a state of the child seat device in the case of a head-on collision of the car.

The base 180 placed on a seat cushion 22 of a car seat 20 is firmly bound thereon because the arms 152 at the rear thereof are connected to the clamp bars 174 on the right and left rear sides of the seat 20, and the swing stopper 162 on the rear side is pressed against the seat back 24 of the seat 20.

The child seat body 120 is connected to the base 180 while the bar 122 at the front bottom thereof is engaged with the guide member 200, and the shafts 124 on the right and left rear sides are rotatably supported in the arms 220.

In a normal operating condition, as shown in FIG. 3(a), the child seat body 120 is firmly supported on the seat cushion 22 by the base 180 while the bottom portion thereof is joined to the upper surface of the base 180. A passenger, such as an infant, sits in the child seat body 120, and the body of the passenger is bound by a binding tool, such as a child webbing (not shown).

In such a state in which the child seat device is placed on the car seat 20 and the passenger is sitting in the child seat body 120, when the car has a head-on collision, a great forward force acts on the child seat body 120 and the base 180. Then, the base 180 pivots on the clamp bars 174, and its front portion sinks into the seat cushion 22.

In this case, the child seat body 120 pivots on the shafts 124 rotatably supported by the arms 220, the front thereof swings forward and upward along the guide member 200 via the bar 122, and the child seat body 120 separates from the base 180. For this reason, even when the front of the base 180 sinks into the seat cushion 22, as shown in FIG. 3(b), the child seat body 120 will not incline forward while following the pivotal movement of the base 180 because the front thereof swings. This does not impose any heavy load on the passenger sitting in the child seat body 120.

In the present invention, the guide member 200 may be provided with shock-absorbing means.

Figure 4A:
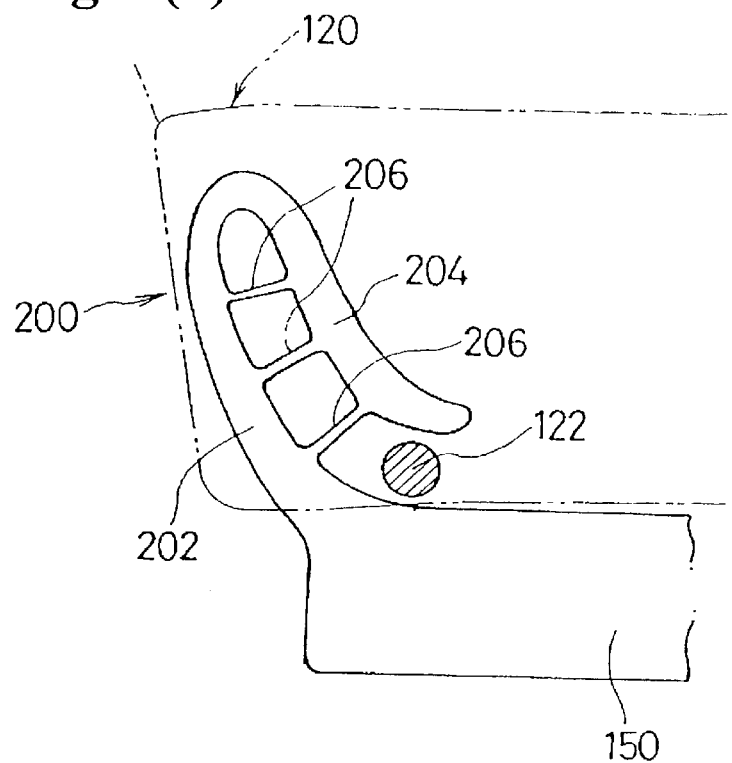
FIGS. 4(a) and 4(b) are explanatory views showing the structure of energy-absorbing walls in the child seat device shown in FIG. 1.
Figure 4B:
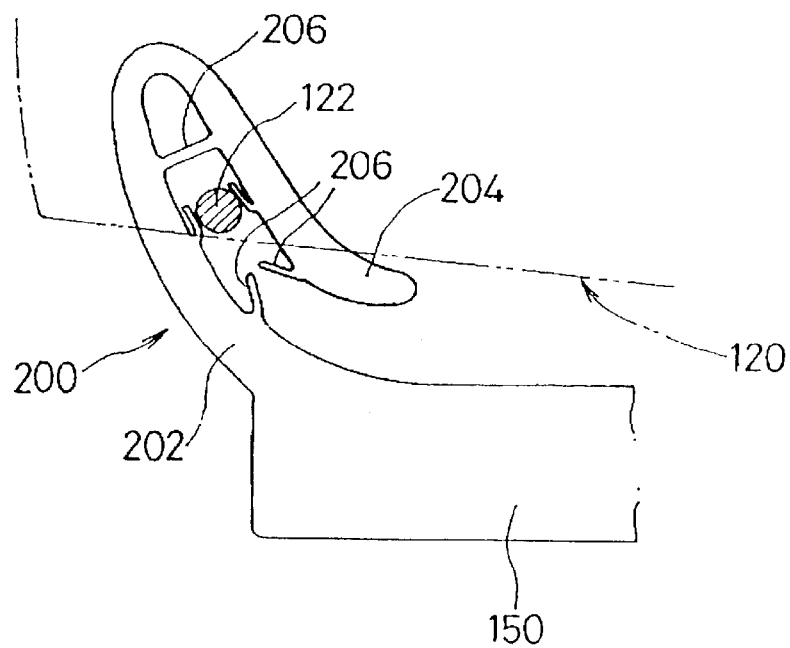

FIGS. 4(a) and 4(b) show an example of the shock-absorbing means. Energy-absorbing walls 206 are formed between the first guide portion 202 and the second guide portion 204 of the guide member 200 so as to close the space therebetween in a normal operating condition of the child seat device. When the bar 122 moves between the first guide portion 202 and the second guide portion 204, the energy-absorbing walls 206 are broken and thereby absorb the kinetic energy of the child seat body 120.

FIG. 4(a) is a side view of the front of the base 180 showing a normal state of the energy-absorbing walls 206, and FIG. 4(b) is a side view of the front of the base 180 showing an energy-absorbing state of the energy-absorbing walls 206.

By forming such energy-absorbing walls 206 between the first guide portion 202 and the second guide portion 204, the load to be applied to the passenger sitting in the child seat body in a head-on collision can be reduced substantially.

Figure 5:
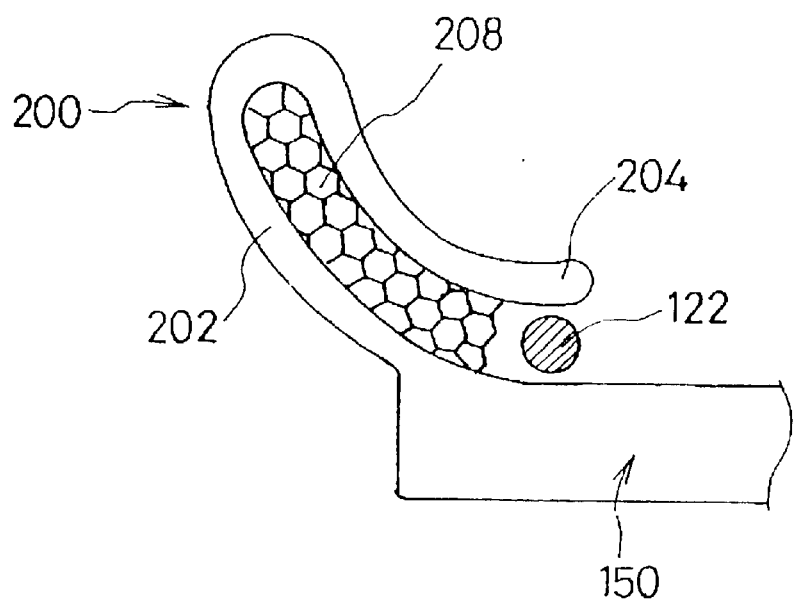
FIG. 5 is a side view of an energy-absorbing member according to another embodiment.

As means for thus absorbing the kinetic energy of the child seat body 120 via the bar 122 in the case of a head-on collision, for example, a honeycomb 208 made of synthetic resin or a relatively fragile metal may be used, which fills the space between the first guide portion 202 and the second guide portion 204 and which is sequentially crushed in response to the movement of the bar 122 so as to absorb the kinetic energy of the child seat body 120, as shown in FIG. 5.

Figure 6:
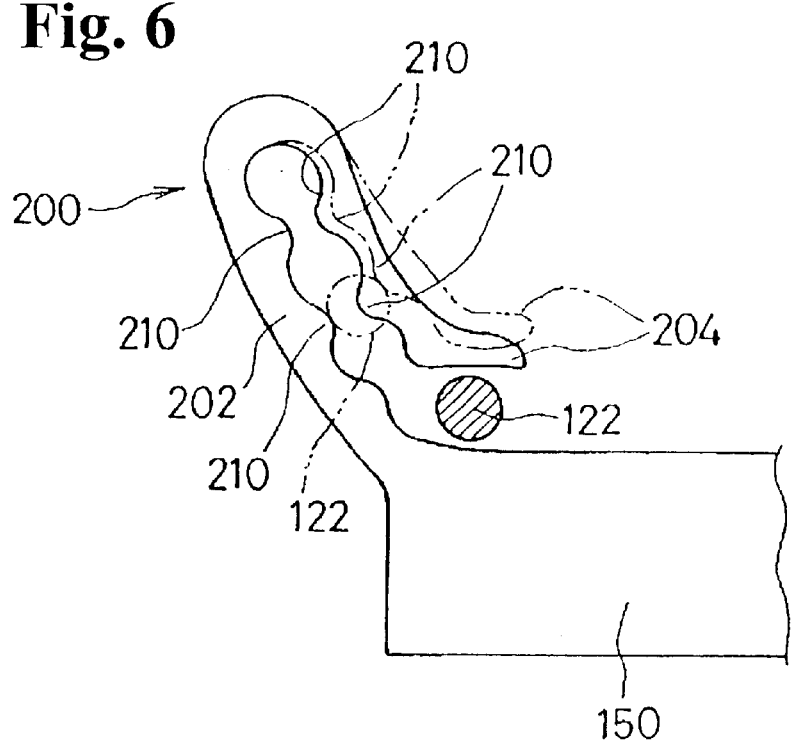
FIG. 6 is a side view of an energy-absorbing structure according to a further embodiment.

Alternatively, as shown in FIG. 6, the kinetic energy of the child seat body 120 may be absorbed by elastically connecting the top of the first guide portion 202 and the top of the second guide portion 204, forming consecutive sine-curve projections 210 on the opposing faces of the guide portions 202 and 204, and allowing the second guide portion 204 to elastically move closer to and away from the first guide portion 202. Thus, the bar 122 can move between the guide portions 202 and 204 while pushing the projections 210 aside.

The projections are not limited to the consecutive sine-curve projections described above, and they may be spike-shaped or may have other various shapes. The projections may be formed on both of the first and second guide portions 202 and 204, or may be formed on only one of them.

Figure 7:
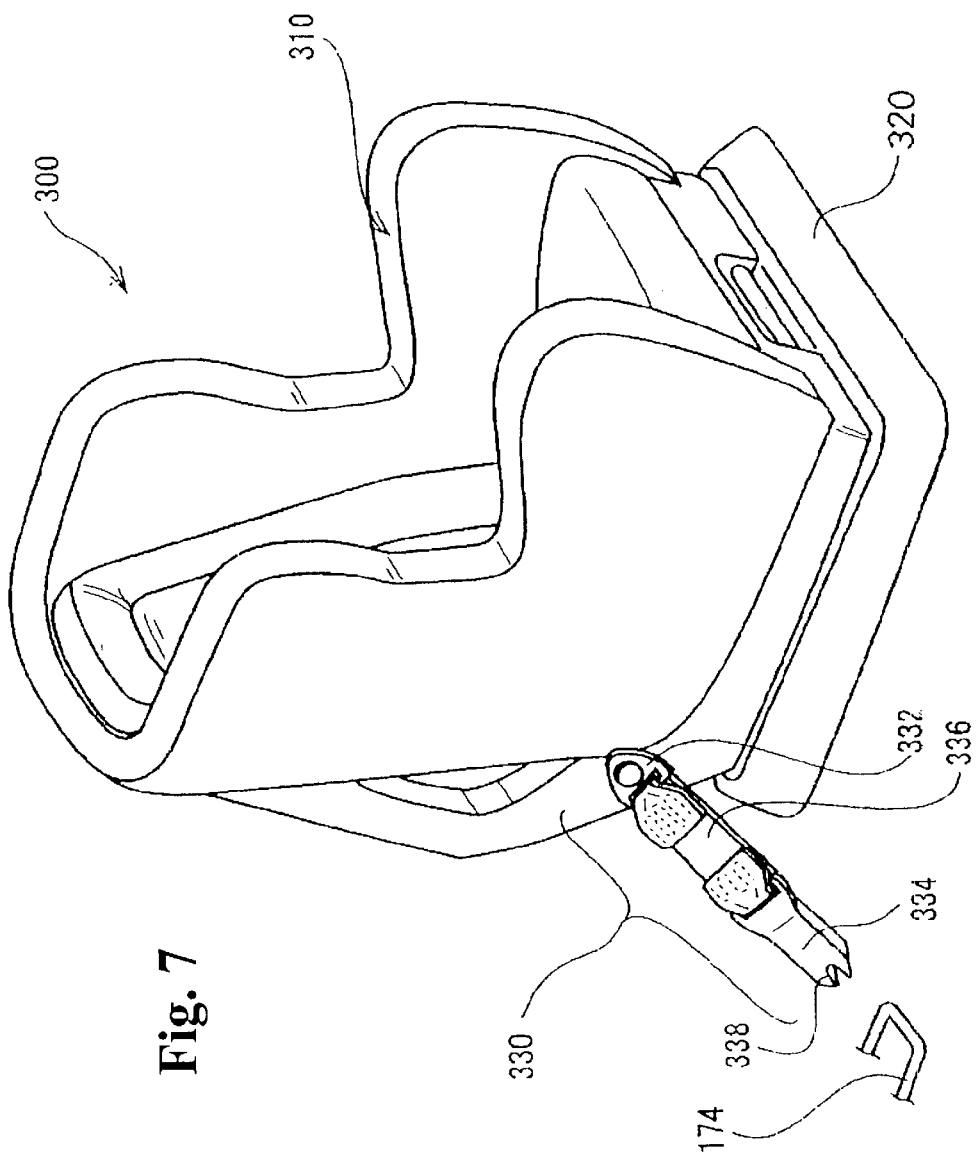
FIG. 7 is a perspective view of a child seat device according to a still further embodiment of the present invention.
Figure 8A:
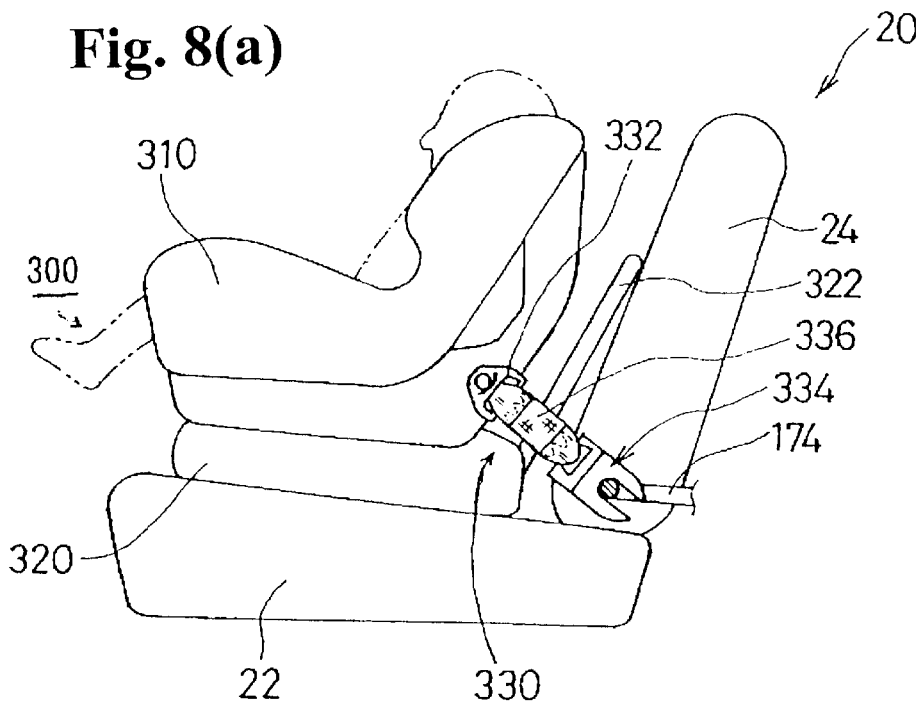
FIGS. 8(a) and 8(b) are explanatory views showing an operation manner of the child seat device shown in FIG. 7.
Figure 8B:
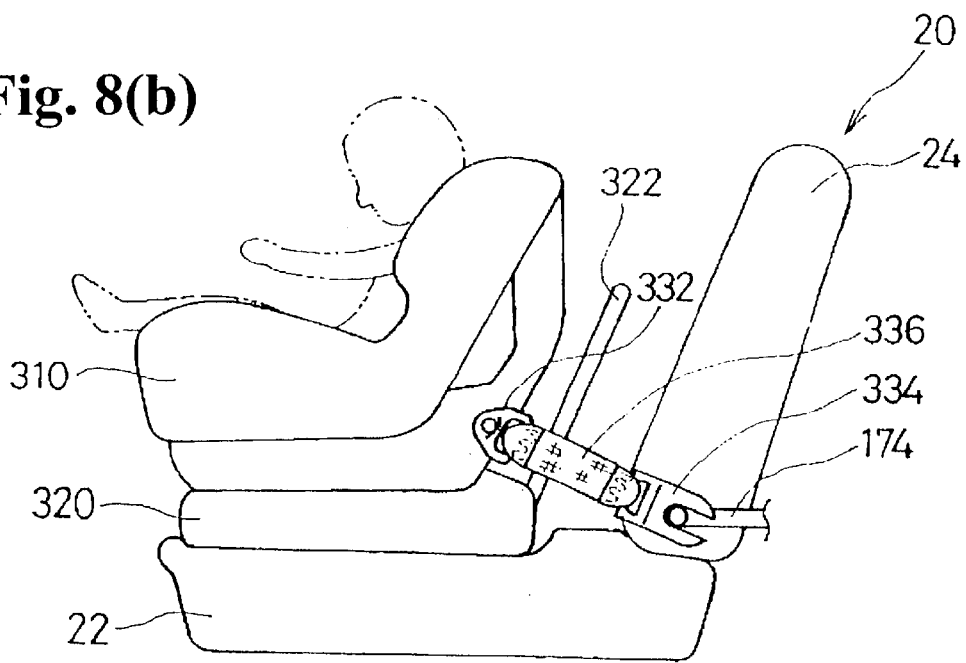
Figure 9:
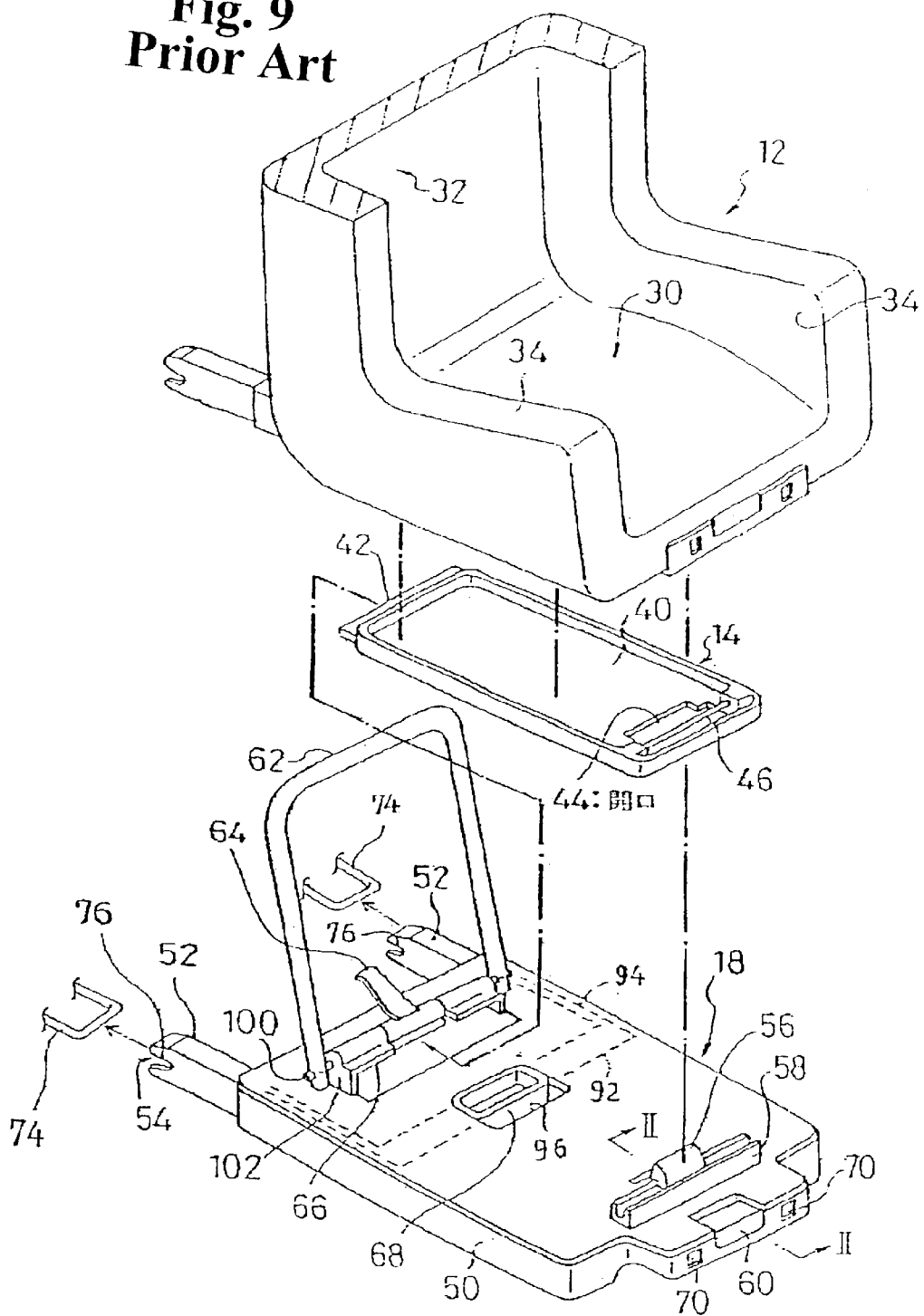
FIG. 9 is an exploded perspective view showing an example of a configuration of a conventional child seat device.

A child seat device according to another embodiment of the present invention will now be described with reference to FIGS. 7 through 8(b). FIG. 7 is a perspective view of the child seat device, FIG. 8(a) is a side view showing a normal operating condition of the child seat device, and FIG. 8(b) is a side view of a state of the child seat device in the case of a head-on collision of the car.

A child seat device 300 comprises a base section 320 to be fixed on a seat cushion of a car seat, and a seat section 310 disposed on the base section 320. In this embodiment, the seat section 310 and the base section 320 are formed integrally with each other. At the rear of the base section 320, there is disposed a swing stopper 322 which is pressed against a seat back of the seat when the base section 320 is placed on the seat cushion of the seat, thereby preventing the base section 320 from swinging due to vibration or the like during driving. The child seat device 300 also includes connecting members 330 for connecting the rear bottom of the seat section 310 and clamp bars 174 formed on the right and left rear sides of the car seat.

Each connecting member 330 comprises a webbing 336 made of cloth, fabric, or the like which can increase its length against tension higher than a predetermined value that is applied from both ends in the extending direction, an anchor 332 mounted at one end of the webbing 336 and connected to a side face at the rear bottom of the seat section 310, and a grip portion 334 mounted at the other end of the webbing 336 so as to grip the clamp bar 174. One connecting member 330 is provided on each of the right and left side faces at the rear bottom of the seat section 310 with the anchor 332.

The grip portion 334 receives the clamp bar 174 in a recess 338 formed at its leading end, and latches the clamp bar 174 by a hook (not shown) formed inside the recess 338, thereby gripping the clamp bar 174 in the recess 338. The clamp bar 174 can be arbitrarily unlatched from the hook by operating an operating piece (not shown).

The rear portion of the seat section 310 and the clamp bar 174 can be easily and firmly connected by inserting the clamp bar 174 into the recess 338 from the leading side of the grip portion 334, latching the clamp bar 174 by the hook, and gripping the clamp bar 174 in the recess 338.

Description will be given below to a method for installing the child seat device 300 with such a configuration, and the operation manner of the device in the case of a car collision.

The child seat device 300 is placed on the seat cushion 22 of the car seat 20. The child seat device 300 is inhibited from swinging relative to the seat cushion 22 because the swing stopper 332 disposed at the rear of the base section 320 at the bottom thereof is pressed against the seat back 24 of the seat, and is bound so as not to separate from the seat 20 because the rear bottom of the seat section 310 and the clamp bars 174 placed on the right and left rear sides of the seat 20 are connected via the connecting members 330.

In a normal operating condition, the child seat device 300 is firmly fastened to the rear end of the seat cushion 22 by the connecting members 330, as shown in FIG. 8(a). A passenger, such as an infant, sits in the seat section 310, and the body of the passenger is bound in the seat section 310 by a binding tool, such as a child webbing (not shown).

The child seat device can be easily removed from the seat 20 by being unbound from the seat 20 by releasing the clamp bars 174 from the grip portions 334 through the operation of the operating piece (not shown), and removing the force for urging the swing stopper 322 against the seat back 24.

In a state that the child seat device 300 is installed on the car seat 20 and the passenger is sitting in the seat section 310, when the car has a head-on collision, a great forward force acts on the child seat device 300. For this reason, an enormous tension in the extending direction is applied to the connecting members 330 which connect the rear bottom of the seat section 310 and the clamp bars 174.

In this case, the webbings 336 increase their lengths against the tension. This substantially reduces the load to be applied to the passenger sitting in the seat section 310 of the child seat device 300.

In this embodiment, the rear bottom of the seat section 310 and the clamp bars 174 are connected via the webbings 336. The seat section 310 is bound on the car seat by the webbings 336 in a normal operating condition, and the webbings 336 absorb the kinetic energy of the seat section 310 and thereby reduce the load on the passenger while increasing their lengths in the case of a head-on collision of the car. As the connecting members 330 for connecting the rear bottom of the seat section 310 and the clamp bars 174, any member (or any structure) may be used instead of such webbings 330 as long as it has a function equivalent to that of the webbings 336.

While the entire child seat device 300 is bound on the seat by combining the base section 320 and the seat section 310 and by connecting the rear bottom of the seat section 310 and the clamp bars 174 via the connecting members 330 in the above embodiment, the base section and the seat section may be formed separately. When the base section and the seat section are separated, for example, the base section may be firmly bound to the seat section via arm members, which are disposed at the rear of the base section and each of which has a grip portion for gripping the clamp bar 174, and the seat section may be bound to the base section by placing the seat section on the base section and connecting members disposed at the rear bottom thereof to the rear of the base section. In this structure, in the case of a head-on collision of the car, the seat section slides forward on the base section while increasing its length, the kinetic energy is absorbed by the connecting members, and this substantially reduces the load applied to the passenger. Operations of installing and removing the child seat device onto and from the car seat can be easily performed by separately handling the seat section and the base section.

As described above in detail, according to the child seat device of the present invention, it is possible to substantially reduce the load to be applied to the passenger in the case of a head-on collision of the car.

While the invention has been explained with reference to the specific embodiments of the invention, the explanation is illustrative and the invention is limited only by the appended claims.

What is claimed is:

1. A child seat device, comprising:

a base to be placed on a seat of a car and connected to a member of the car at a rear portion thereof, said base having a guide member extending forward and upward from a front thereof, said guide member having a first guide portion rising forward and upward from the base, a second guide portion extending along the first guide portion at a rear side of the first guide portion, a top of the second guide portion connected to the first guide portion, and a bottom of the second guide portion spaced from the base so that a space is formed between the bottom of the second guide portion and the base, and a child seat body having a supporting portion pivotally supported on the base, and a bar extending in a widthwise direction of the child seat body as an engaging member engaging the guide member to be able to move between the first and second guide portions along the guide member when a predetermined force is applied to the child seat body.

2. A child seat device according to claim 1, wherein said guide member further includes an energy-absorbing member formed between the first guide portion and the second guide portion so as to deform and absorb a kinetic energy of the child seat body when the bar moves between the first guide portion and the second guide portion.

3. A child seat device according to claim 1, wherein the top of the second guide portion is elastically connected to a top of the first guide portion, and at least one of opposing faces of the first and second guide portions includes at least one projection, which is pressed by the bar so as to move the second guide portion closer to and away from the first guide portion when the bar moves therebetween.

4. A child seat device according to claim 1, wherein said base includes a base body from which said guide member extends, and arms extending upwardly from the base body; and said child seat body includes as the supporting portion shafts extending in the widthwise direction thereof, said shafts being removably and pivotally fixed to the arms.

5. A child seat device according to claim 4, wherein said space between the first and second guide portions extends along a curvature of an arc formed around a center of the shafts when the child seat body is fixed to the arms.

\* \* \* \* \*